United States Patent
Day et al.

(10) Patent No.: US 10,284,568 B2
(45) Date of Patent: May 7, 2019

(54) SYSTEM AND METHOD FOR SECURE TRANSMISSION OF STREAMED DATA FRAMES

(71) Applicant: Guardtime IP Holdings Limited, Tortola (VG)

(72) Inventors: Garrett Day, Arlington, VA (US); Hema Krishnamurthy, Phoenix, AZ (US)

(73) Assignee: Guardtime IP Holdings Limited, Tortola (VG)

( * ) Notice: Subject to any disclaimer, the term of this patent is extended or adjusted under 35 U.S.C. 154(b) by 142 days.

(21) Appl. No.: 15/245,012

(22) Filed: Aug. 23, 2016

(65) Prior Publication Data

US 2018/0063139 A1   Mar. 1, 2018

(51) Int. Cl.

| | |
|---|---|
| H04L 29/06 | (2006.01) |
| G06F 21/64 | (2013.01) |
| G06F 7/58 | (2006.01) |
| G06F 16/901 | (2019.01) |
| H04L 9/32 | (2006.01) |
| H04N 21/234 | (2011.01) |
| H04N 21/4223 | (2011.01) |
| H04N 21/835 | (2011.01) |
| H04L 9/06 | (2006.01) |
| H04L 9/08 | (2006.01) |
| G06F 16/71 | (2019.01) |

(Continued)

(52) U.S. Cl.
CPC ............ *H04L 63/123* (2013.01); *G06F 7/582* (2013.01); *G06F 16/71* (2019.01); *G06F 16/9027* (2019.01); *G06F 21/64* (2013.01); *H04L 9/0662* (2013.01); *H04L 9/0872* (2013.01); *H04L 9/3236* (2013.01); *H04L 9/3247* (2013.01); *H04N 21/23418* (2013.01); *H04N 21/4223* (2013.01); *H04N 21/835* (2013.01); *G06F 16/29* (2019.01); *G06F 21/606* (2013.01); *H04L 67/12* (2013.01); *H04N 7/18* (2013.01)

(58) Field of Classification Search
CPC ..... H04L 63/123; G06F 21/606; G06F 21/64; G06F 7/582
See application file for complete search history.

(56) References Cited

U.S. PATENT DOCUMENTS

| | | | | |
|---|---|---|---|---|
| 2008/0222420 | A1* | 9/2008 | Serret-Avila | G06F 21/64 713/176 |
| 2012/0317420 | A1* | 12/2012 | Matsuo | G06F 21/64 713/176 |

(Continued)

FOREIGN PATENT DOCUMENTS

| | | | | |
|---|---|---|---|---|
| WO | WO-2016110718 | A1 * | 7/2016 | H04N 21/235 |

*Primary Examiner* — Robert B Leung
(74) *Attorney, Agent, or Firm* — Jeffrey Pearce (57) ABSTRACT

Data acquired, for example by a mobile platform, such as a sequence of images observed by a mobile platform, is grouped. A signature is computed for each group and is transmitted along with frame data to a reception system, which verifies correct transmission based on the group signature. The signature may be a root value of a hash tree that has at least selected ones of each group as inputs. Transmission events may also be separately signed as a whole using an event validation system. Although the signature maybe computed for all frames in a group, it may also be computed based on only a subset, selected pseudo-randomly.

38 Claims, 4 Drawing Sheets

(51) Int. Cl.
H04L 29/08 (2006.01)
G06F 21/60 (2013.01)
G06F 16/29 (2019.01)
H04N 7/18 (2006.01)

(56) References Cited

U.S. PATENT DOCUMENTS

2013/0107065 A1* 5/2013 Venkatraman ..... H04N 5/23248
348/208.4
2013/0291082 A1* 10/2013 Giladi ................... H04L 63/123
726/7
2016/0204942 A1* 7/2016 Bohli ....................... G06F 21/64
713/168

* cited by examiner

SYSTEM AND METHOD FOR SECURE TRANSMISSION OF STREAMED DATA FRAMES

FIELD OF THE INVENTION

This invention relates to secure transmissions of data that is streamed as sets such as frames.

BACKGROUND

Serious breaches of data security are in the news almost daily. These issues are of several different types, relating essentially to questions such as "Has any unauthorized person accessed any of this data?" and "Has anyone tampered with this data?" Common ways to address these issues include the securing of data with the use of keys, such as in a private/public key pair scheme such as PKI or some other form of key-based encryption, typically backed by digital certificates issued by some certificate authority (CA).

Some of the disadvantages of such arrangements include the need to securely store possibly large numbers of key pairs, the need to rely on the integrity of the certificate authority, the possibility that the keys may expire, etc. In short, a key-based approach requires maintaining at least one "secret" in each system pair that communicates, as well as reliance on (in most cases) a third-party CA.

The complications associated with key-based security are multiplied greatly in the case of large data sets that are created and/or streamed as units such as video frames, blocks, etc. If entire streams are encrypted or secured as a whole with keys, then there may be an unacceptable delay in transmission, a greater storage requirement, and/or a greater risk that the transmitted data itself will be corrupted even absent any malicious action. On the other hand, if streams are encrypted or secured in smaller units, then it will be necessary to generate and maintain at least one, and typically two, keys for each unit; this adds even more to the processing and administrative burden. Note that this burden is usually duplicated, since encryption and key maintenance of the transmission side must usually be matched by decryption and key maintenance on the receiving side as well.

DETAILED DESCRIPTION

Merely by way of example, embodiments of the invention are illustrated below in the context of a video acquisition, transmission, and processing system. As is usual with video acquisition, image data is captured, processed, and presented as frames. The invention may be used in more general contexts, however, in which a series of data sets is to be transmitted to a receiving system, and there verified.

Figure 1:
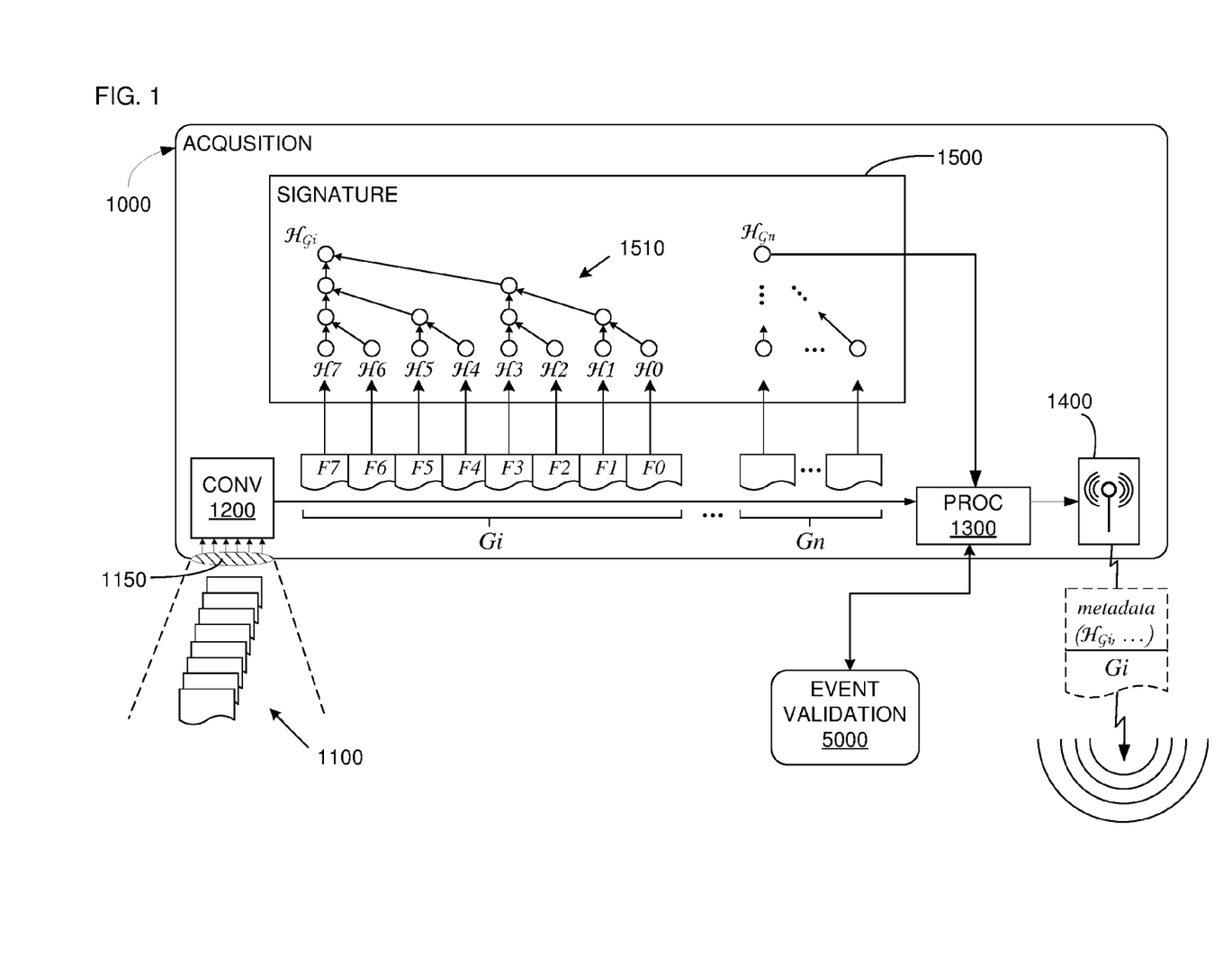
FIG. 1 illustrates one embodiment of a system to verifiably transmit a series of video frames from a sensing system to a receiving system.

An acquisition system 1000 may be of any type, both fixed and mobile. As just one example the acquisition system may be an airborne or land-based (mobile, such as a vehicle, or fixed) surveillance platform, in which a sequence of images 1100, which are observed and captured by a sensor 1150 such as a camera (configured for any or any combination of wavelengths, including, but not limited to, optical, infrared, etc.). In addition to image data, it would also, or instead, be possible to observe and acquire audio or other data as well, although any continuous data stream should preferably be subdivided into sets analogous to frames. For example, many systems and devices operating in the context of the commonly referred to "Internet-of-Things", which communicate data to some supervisory or reception system, may use embodiments described here to increase the security of transmission of streamed data. Video data is thus described here merely as one example, since it rather naturally is divided into sets such as frames.

Each captured image may be converted into digital form by any conventional conversion circuitry 1200 to form a corresponding digital data set, illustrated as digitized images, shown as frames F0, F1, . . . , F7. As FIG. 1 illustrates, the frames are grouped. The number of frames in each group may be chosen depending on the implementation and need not be constant, that is, although it may be preferable from the point of view of not having to change programming or hardware parameters, groups may contain different numbers of frames. FIG. 1 illustrates two frame groups, Gi and Gn. The frame data F0, F1, . . . , F7 may be processed in any desired manner by a processor 1300 for ultimate transmission by a transmitter 1400, which may be wireless or even wired (even hard-wired communications systems can be tampered with). Processing may include any known function or functions, such as compression, filtering, other transformations, etc., although, as will be understood from the discussion below, the receiving system 2000 (FIG. 2) may, depending on the transmission processing, need to invert some or all of the transformations.

In some embodiments, transmission from the acquisition system 1000 to the reception system 2000 is direct, without intermediate "hops", that is, intermediate processing systems. This is not required by the invention; rather, any number of intermediate systems may be included, for example, to relay transmitted data with or without additional processing. Direct transmission is thus shown by way of example.

Although not shown in FIGS. 1 and 2, both the acquisition system 1000 and the reception system 2000 include conventional hardware and software components such as volatile and/or non-volatile storage, for example, to use to store not only the executable code that embodies and implements the various software functions described below, but also, for example, to buffer frame data as needed. System software, such as an operating system, virtual machine hypervisor, etc., will also typically be included in the systems 1000, 2000, although, in the case in which the acquisition system 1000 is a mobile device such as an unmanned aerial vehicle (UAV), the system software may itself be fixed in hardware or firmware; indeed, if a specially designed processor is included in the acquisition system 1000, the functions of the system software could be encoded entirely in hardware, thereby further increasing security.

A data signature module 1500 within the acquisition system 1000 takes as inputs the data of the frames (including any desired frame metadata) of each group, such as Gi. and computes at least one corresponding signature value $\mathcal{H}_{\mathcal{G}}$. Here, the term "signature" is not intended to be limited to any particular conventional scheme, but rather simply to indicate some value, or set of values, that is derived from the frames of the group and preferably also from their order. The probability of two different frame groups getting the same signature, or of the same data frames in a group, but in a different order, getting the same signature value, should be so low as to be negligible in practical computational environments. Moreover, it should be in practice computationally impossible to invert the signature, that is, given a signature, to determine what the frame data was that led to it.

In a preferred embodiment, the signature module 1500 is a hardware component that inputs the frame data, computes the corresponding signature value, and outputs the signature. Implementing the signature module all or at least mostly in hardware reduces the risk of a security attack. For the same reason, the frame data is preferably input to the signature module independent of, and before it is passed to the processing system 1300, that is, as soon after creation by the conversion module 1200 as possible. As needed, the signature module 1500 may include its own processor and internal registers for these purposes. As an alternative, executable code that implements the computations of the signature module may be included in a read-only device. It would also be possible to implement the signature module 1500 purely in software, executed on the same processing system 1300 as other software components Assume just by way of example that each frame group comprises eight frames of data. Of course, this number may vary, depending on the implementation. In one embodiment, illustrated in FIG. 1, the signature value $\mathcal{H}\mathcal{G}$ for group Gi is computed by first computing a corresponding hash value $\mathcal{H}0, \mathcal{H}1, \ldots \mathcal{H}6, \mathcal{H}7$ from the respective data (including any desired metadata) of each of the frames in the group, or a selected subset thereof, and then combining these hash values to create the signature $\mathcal{H}\mathcal{G}$ for the group. One way to compute $\mathcal{H}\mathcal{G}$ would be to concatenate either the frame data itself, or the hash values, and then to hash that concatenated data set. One disadvantage of this choice is that the buffer needed to hold all the frame data until computation of the signature may be larger than desired, or may leave at least some of the data exposed to tampering for too long, or may make it more difficult to transmit a steady stream of frame data instead of having delays between "batches".

In one embodiment, the signature $\mathcal{H}\mathcal{G}$ for the group Gi is therefore computed as the root value of a Merkle tree, which is a form of binary hash tree, in which each parent node is the hash value computation of two children nodes. In FIG. 1, such hash computations are indicated by circles. One advantage of the Merkle tree is that, none of the hash values $\mathcal{H}0, \mathcal{H}1, \ldots \mathcal{H}6, \mathcal{H}7$ needs to be buffered longer than its immediately previous value. Another advantage is computational efficiency, in that no hash computation needs to have more than two inputs. If a Merkle tree is used, then the top hash of the tree may be used as the signature $\mathcal{H}\mathcal{G}$ for the group Gi.

The frame data of each group, and the signature for the group, is passed to the processing system 1300, which transforms this information in any desired manner and prepares it for transmission via the transmission system 1400. In one embodiment, each frame of data is prepared and transmitted as it is received by the processor, with the corresponding group signature being transmitted at the end of the frame when it is computed. This allows for an essentially constant, real-time steam of frame data. In another embodiment, the frames in each group are transmitted only after their corresponding group signature is computed. The signature for each data frame group may be transmitted either separately, or, for example, as part of the metadata transmitted along with one or more of the constituent data frames in the group. By way of example, FIG. 1 shows the data group Gi, being transmitted, along with its signature $\mathcal{H}\mathcal{G}$, which is shown as being part of the metadata for the transmission.

In many implementations, there will be only a single transmission system 1400, or only a single wavelength or characteristic spectrum used for transmission. This is not necessary in all implementations, however. For example, it would be possible to transmit the frame data using one system or wavelength/spectrum, but to transmit the signatures using a different system or wavelength/spectrum.

In addition to the signature $\mathcal{H}\mathcal{G}$ for the group Gi, it would also be possible to generate verifying information for the group transmission as a whole, as well as any desired metadata. Each such transmission, with, for example, the frame data, the group signature, any included metadata relating to the transmitted frame data and/or the acquisition system 1000 itself (such as time, geographic coordinates, operating state information, error detection and/or correction data, etc.) may be considered an "event". Each event, or any collection of events, may optionally be given a second signature enabling "meta-verification", that is, verification not only of the contents of the frame data, but also of the transmission information. An event validation module 5000 may then take the data to be thus verified, compute a verifying signature for it, and return it to the acquisition system. For example, let Si be the set of data that comprises the event i, and $\Sigma i = \Sigma(Si)$ is the event-verifying signature of Si.

Although the event validation module 5000 is shown as being external to the acquisition system, and accessible, for example, via the same transmission system(s) as is used to other data transmission, it could also be incorporated into the acquisition system itself as a dedicated software, firmware, or hardware component.

The nature of the component used to implement the event validation module 5000 will depend in part on the type of verifying signature chosen. One option for a verifying signature would be yet another Merkle tree, but with, for example a hash of each of the data sets Si as successive inputs, or with each element of the set Si forming a different input to a per-group hash tree computation.

As another alternative, $\Sigma i$ could be computed as a signature returned by the distributed hash tree infrastructure (the "Guardtime infrastructure") that has been developed by Guardtime As of Tallinn, Estonia, and which is disclosed in U.S. Pat. Nos. 8,347,372; 8,312,528; and 7,698,557 (all Buldas, et al., "System and method for generating a digital certificate") as well as U.S. Pat. No. 8,719,576 (also Buldas, et al., "Document verification with distributed calendar infrastructure"), all of which are incorporated herein by reference. In short, a system that implements the hash tree infrastructure of Buldas '576 may be used the event validation module 5000. One advantage of such a signature infrastructure is that it does not depend on the use of keys, and thus has no need to maintain them or trust a key-issuing certification authority. Instead, each Guardtime signature is in practice a vector of values that include parameters enabling recalculation of values pairwise upwards through the hash tree created at each of a sequence of calendar times to a top-most calendar value. Given the same input and the Guardtime signature, which contains the corresponding calendar value, a verifier can, if desired, independently hash the signature parameters pairwise in a recursive fashion. If the end result matches the calendar value, the input is verified.

For additional security, the signatures can be extended after a number of calendar periods up through a Merkle tree of calendar values to a publication value that is published in any widely witnessed manner, such as in a printed publication, an online database, in a ledger, in a blockchain, etc. It is also possible to forego the accumulation of calendar values via a Merkle tree and instead enter each calendar value into some widely witnessed data structure such as a blockchain-backed ledger.

Another advantage is that signature generated using the Guardtime infrastructure encodes an essentially irrefutable timestamp as well. Yet another advantage is that, if the event verification module containing the Guardtime infrastructure is external to the acquisition and reception systems, then the integrity of its state is still independently verifiable. Still another advantage of the Guardtime infrastructure is that the signatures it generates can be verified without having to query the Guardtime infrastructure itself again, although this is an option.

Figure 2:
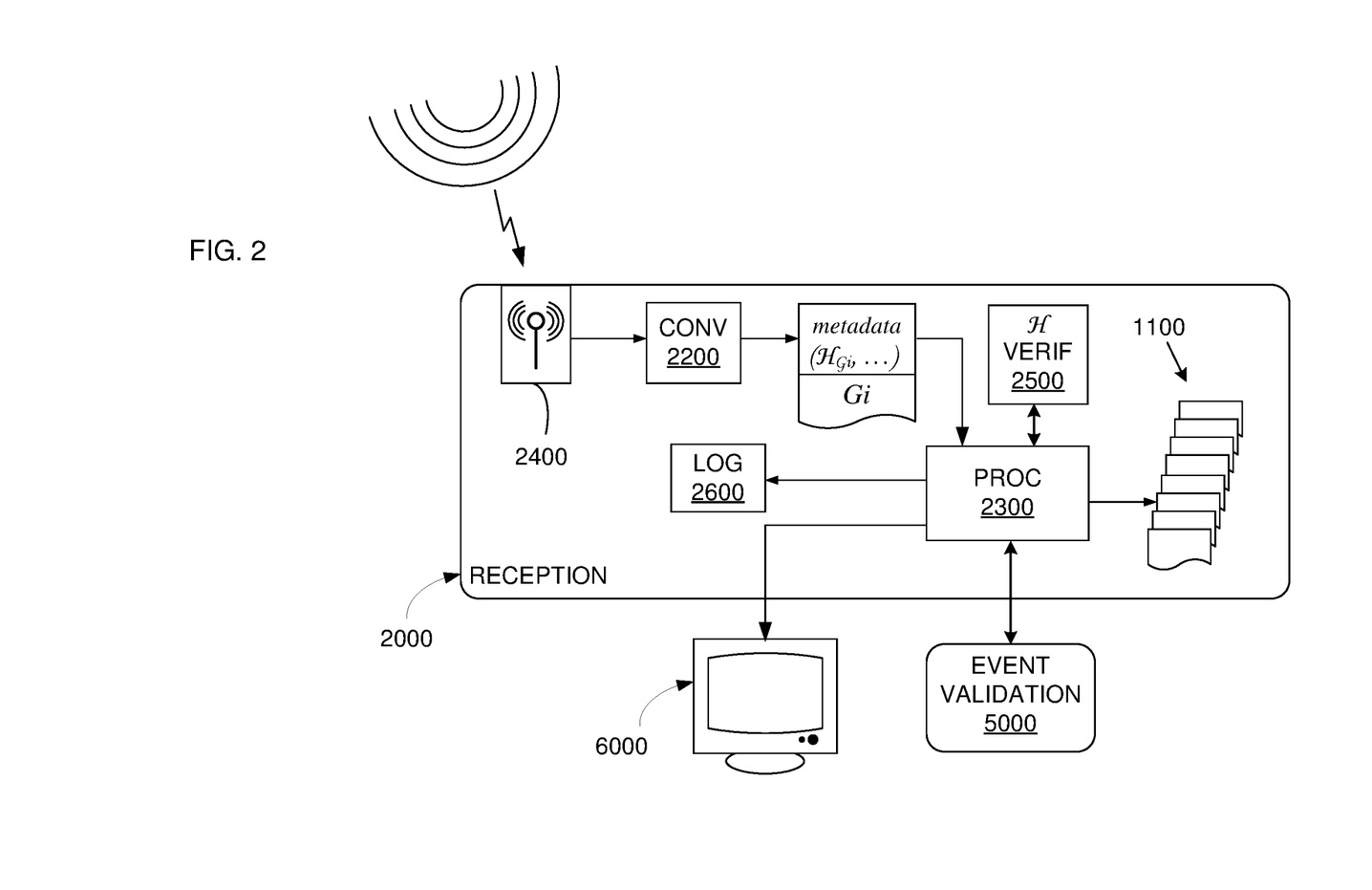
FIG. 2 illustrates the main components of the receiving system

See FIG. 2. Via any receiver 2400 chosen to match the transmission system 1400 (FIG. 1), the reception system 2000 receives the transmission from the acquisition system 1000 and converts it into digital, processable form using any appropriate conversion circuitry 2200 to extract the group (or frame, depending on how much is transmitted as a unit) data Gi, the group data signature $\mathcal{H}_{\mathcal{G}}$, the meta-verification signature $\Sigma i$ (if included), and any other metadata chosen to be in the transmission.

Using the processing routines corresponding to those used to format and process the transmitted data for transmission, the processing system 2300 may then recreate at least what it may provisionally assume to be the original data frames 1100. Before accepting the recreated data frames as correct, however, the processing system submits the data that has been received and that was supposedly used to create the signature $\mathcal{H}_{\mathcal{G}}$ to a signature verification module 2500, which then recomputes the signature $\mathcal{H}$. If, given the received group data Gi frame data as inputs, the signature verification module 2500 computes the same $\mathcal{H}_{\mathcal{G}}$ value as was transmitted from the acquisition system 1000, then the reception system may conclude that the transmission was correct and unaltered relative to the frame data that was originally acquired. The frame data may then be passed for further processing, storage, and analysis as desired.

On the other hand, if the recomputed data signature does not match the transmitted data signature given the supposedly same inputs, then there is some error in either the received frame data, or the received group signature, or both. The reception system may in such initiate and desired error protocol, ranging from requesting retransmission of the group data (if this is possible), to alerting a human or automated administrator of the error. If more than some threshold number of verification failures are detected in a chosen time period, then the administrator may follow any desired failure protocol, for example, choosing to isolate transmissions from the acquisition system, or deactivating it, or commanding it to leave its station and return to an appropriate facility for closer analysis, or even to destroy itself.

As one option, an index may be included as part of the metadata for each frame. Using the greatly simplified example shown in FIG. 1, the metadata for frame Fj could include some index that indicates j. During the verification phase, it would then be easier to determine which, if any, of the frames failed or is missing. Any attempt to introduce a fake frame would then also require knowledge of order in the group, which further complicates such malicious efforts.

If an event signature $\Sigma i$ was also computed and transmitted, then the reception system 2000 may also verify it before finally accepting the transmitted frame data as being authentic. If a Guardtime signature scheme was used for $\Sigma i$, then it will normally be possible for the processing system to recompute and verify $\Sigma i$, without needing to refer to an external entity; otherwise, the reception system may submit the event signature to such an external validation system, which may be the same system 5000 as originally generated $\Sigma i$. If one or more intermediate systems (such as a relay station) are included between the acquisition and reception systems, then it would be also possible to recompute and verify the signature $2i$ at any or all of those "hops" as well, to more quickly detect errors, and also to better isolate between which two points the error was introduced or otherwise occurred.

If $\mathcal{H}_{\mathcal{G}}$ and, if included, $\Sigma i$ recompute to their assumed values (as transmitted), the reception system may log the data (preferably including signatures) relating to the transmission event in a log 2600, which may be internal or remote, or both, and may be stored in a dedicated storage component, or in the general storage system of the reception system. The frame data, with or without all or some chosen part of its metadata, may then also be passed to an administrative or other system 6000 for viewing on a display, or forwarding to any other entity. The frame data itself may also be stored for later viewing and analysis, either in the reception system's internal storage, or externally.

As a security measure, it would also be possible to store the signature(s) $\mathcal{H}_{\mathcal{G}}$ and $\Sigma i$ along with any chosen identifier for the transmission, or group (or frame) they correspond to, in yet another, separate storage system such that any future tampering with both the underlying data and the signatures in the "primary" storage system. Any attempt to tamper with the stored frame data, and to substitute recomputed signatures, can then be detected. Note that, if the Guardtime infrastructure is used to generate the event verification signature, then the even verification signature itself may alone be irrefutable, since it may encode not only the time of generation, but, depending on the implementation of the infrastructure, even information unrelated to the transmission and thus unknowable by an attacker.

If the signatures are maintained along with the data that led to them, then it will be possible at any later time to "audit" it—at any time, if the stored frame data does not lead to a recomputation of the correct signature(s) then the auditor or system administrator may be notified and take any corrective or investigative action, since this indicates some change in the underlying data. Periodic background checking of the signatures of stored frame transmissions may also be implemented to detect any tampering even before a specific audit.

Figure 3:
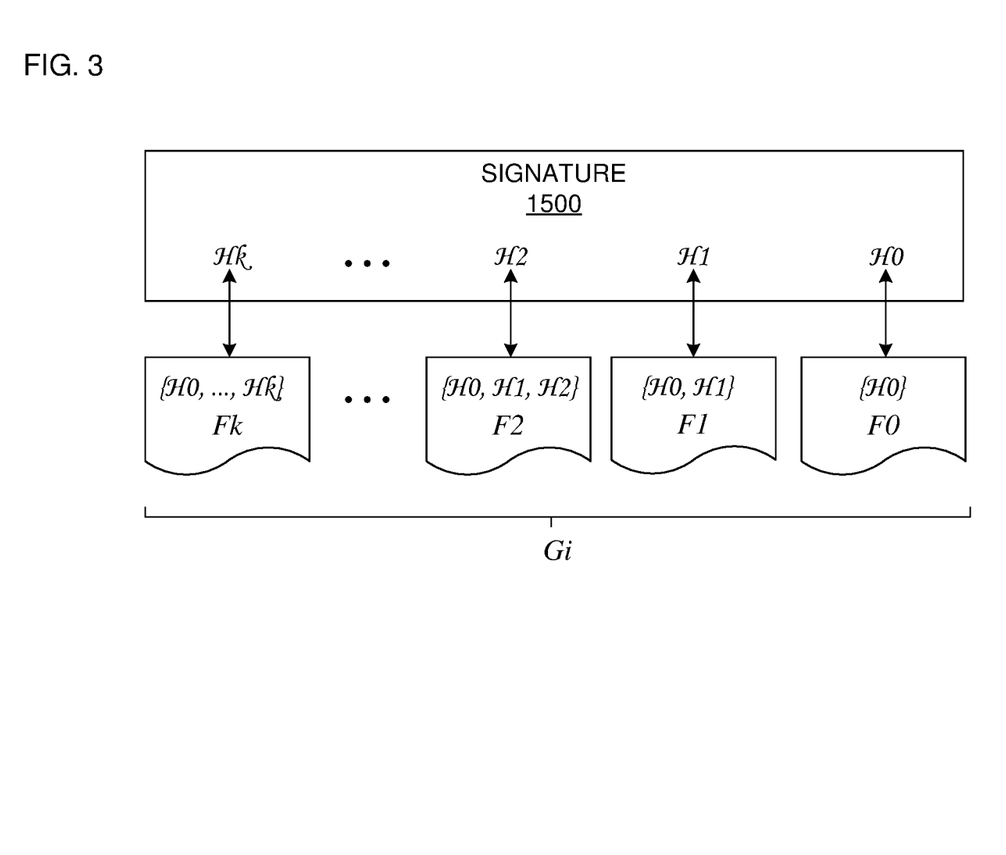
FIG. 3 illustrates an alternative arrangement for handling failure of transmission of at least one acquired data frame.

See FIG. 3 and assume that there is a transmission error, such that at least one frame of data in a group Gi of k frames fails to transmit, or transmit properly, and cannot be reconstructed through any error correction scheme associated with the transmission. Using the arrangement described above, without the missing frame data and its hash, the reception system will not be able to confirm the correctness of any of the data in the group, which may require a reacquisition and/or retransmission (if the data can be re-acquired or was buffered and can be retransmitted at all), or omission of the group altogether.

In the embodiment illustrated in FIG. 3, the metadata associated with each acquired frame includes its own hash (computed by the signature module 1500 or otherwise), as well as the hash of at least one previous data frame. In the case illustrated in FIG. 3, the metadata for each frame includes the hash value of that frame, as well as the hash value of all previous frames in the group of k frames.

Now assume that one of the data frames, say, F1 fails to transmit properly, or at all, for example, because of some signal loss. Assuming that the group signature $\mathcal{HG}$, which may be transmitted along with the group metadata, or separately, or included in the metadata of the last frame in the group, was properly received by the reception system 2000, then it will still be possible to verify that the received frames in the group are correct, since the hash $\mathcal{H}1$ for the missing frame F1 will be available in the metadata of the following frame F2. In general, if each frame includes the hash value of the previous p frames, then it will still be possible to verify the remain k-p frames even if p consecutive frames are lost. Suitable adjustments or additional metadata may be included elsewhere to deal with the case that the lost frames are the last-created in a group. Although it would require some amount of buffering, another option would be for one or more frames to include the hash values not only of one or more previous frames, but also, or instead, of one or more following frames. In either case (or both), varying degrees of fault tolerance are provided by having at least one frame include in its metadata the hash value of at least one other frame.

As part of each frame's metadata, it would also be possible to include, in addition to or instead of the list of previous hash values, a value computed recursively as the hash of the current and previous frame's hash values. Any attempt to alter any of the hash values would then be detectable upon recomputation by the reception system; furthermore, by rehashing the frames and computing forward through the hash values, the system could identify at which frame corruption occurred, since the recursively computed value received in the transmission would not match from that frame forward.

Figure 4:
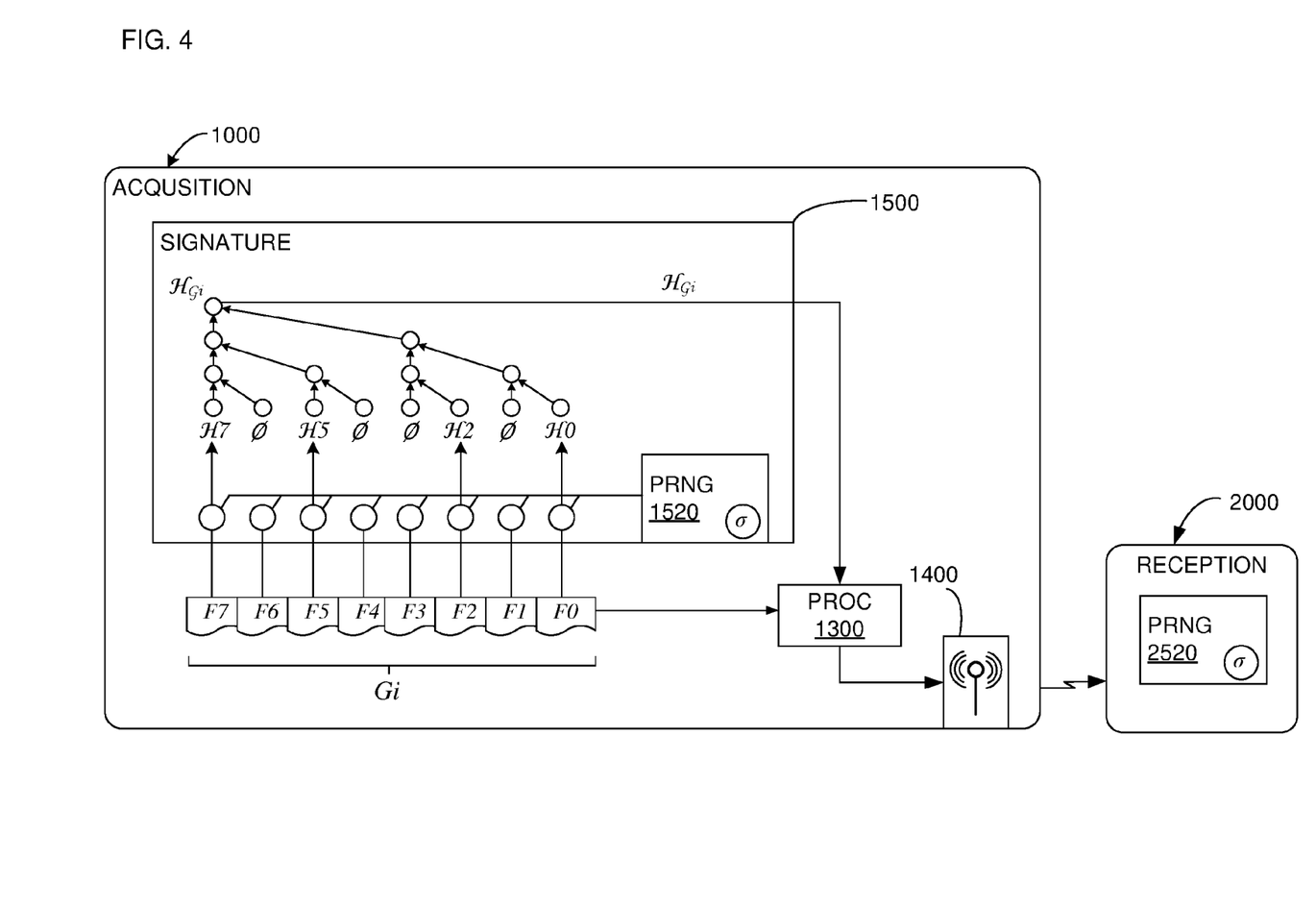
FIG. 4 illustrates an arrangement that provides randomized verification inputs.

FIG. 4 illustrates an optional randomization process that may be used to increase the difficulty of defeating the other security features in embodiments of the invention. Even aside from security, this optional randomization process may help reduce the computational burden in cases where there is a large number of frames in each group by reducing the number of frames whose data is included in the hash value for the group. In the example above, data of all eight of the frames F0, F1, . . . , F7 in group Gi were hashed to create the hash value $\mathcal{HG}$ for the group. In this embodiment, however, a subset of the group's frames is selected for hashing and combination using the Merkle tree.

For this randomized embodiment, a pseudo-random number generator (PRNG) 1520 generates random numbers that are used to select which frames in the current group will be chosen for hashing and used in computation of the group's overall hash value. This module may be within the signature module 1500, or encoded in the processor 1300 itself, or it may be implemented in any other part of the acquisition system. Any algorithm may be used to map the pseudo-random numbers generated by the module 1520 to the frames in the current group. For example, if there are frames in a group, then the module 1520 can simply select frames as a function of its output mod k.

The module 1520 is preferably initialized using a seed value a. Being preferably only pseudorandom, and assuming a repeatable initial state, any system running the same PRNG algorithm given the same initial seed value a (plus any other desired but repeatable input parameters) will generate the same sequence of pseudorandom numbers. In particular, if a corresponding pseudorandom number generator 2520 is included in the reception system 2000, and it knows the seed value a that the acquisition system used to generate values, as well as the number of values it has generated, then the reception system will also be able to compute the same pseudorandom values used to select frames by the acquisition system, and thus also select the same frames from the same group. The pseudo-random number generation modules in the acquisition and reception systems are thus logically synchronized.

The number of frames selected in each group may be fixed, but it itself could also be randomized. For example, the first pseudorandom number generated for each group could indicate the number k of frames in the group that will be selected. The module 1510 may then generate k pseudorandom numbers and use those to select which frames in the current group are to be hashed and used as inputs to the Merkle tree. Depending on the size of modulus mod relative to k, it would of course be possible for the same frame to be chosen more than once in a given group. Either this could be prohibited by suitable adjustment of the selection algorithm, such as repeated generation of numbers until k different ones have been generated, or through an indexing scheme, or it could simply be permissible for the same hash value to be used as an input more than once in the Merkle tree. In FIG. 4, merely as an example, only frames F0, F2, F5, and F7 are used in computation of the group signature value $\mathcal{HG}$. Null values may be used for other frames, or those "leaves" in the Merkle tree may simply be eliminated.

Assume that there are K total frames in a given group. If only k of those frames are used to compute the hash value signature of the group, then the computational burden (and need for buffering, if any) will be reduced to a factor of about k/K, or even better, depending on how many additional computations each additional input to the signature routine causes.

Upon receiving all of the frames in a transmitted group, the reception system may then regenerate the same sequence of pseudorandom numbers, select the same inputs, and recompute the verifying hash value $\mathcal{HG}$ for the group just as before, albeit with not all frame's data being used for verification.

The method for choosing the seed values a may also be used to increase security. For example, a different seed may be incorporated and fixed in each acquisition system at its respective time of initialization. Alternatively, the seed a may be changed, for example, according to a particular schedule, or at the beginning of each "mission". The different seed values for different acquisition systems and sessions may then be stored in the reception system 2000 and the appropriate seed value could be input and used for verification of transmissions during each session.

It would also be possible to generate seed values dynamically, for example, as a function of time. Especially if a signature arrangement such as Guardtime's is used, then the time of an event, corresponding to a "session", may also be encoded in the signature. For example, if a Guardtime signature is generated before frames are selected for hashing, then the time of that signature could be used as input to whatever algorithm is used to generate a seed value. This time value could then be passed to the reception system, which could then regenerate the seed by applying the same algorithm as is encoded in each acquisition system.

In embodiments in which the acquisition system is a mobile device, the seed value could also be chosen as a function of the geographic position of the device, to within some predetermined precision of the coordinates, for example, at the time the data group is created and its signature is computed. If the acquisition system uses its actual, measured position coordinate(s) to form its seed value, and the reception system uses the expected or intended position coordinate(s), then the reception system would be able to verify a data group transmission only if the acquisition system was where it was expected to be at the time. Even with a complete set of frame data, a malicious actor would thus not be able to create a fake but verifiable transmission unless he also knew where it was expected to be made. Of course, both time and position data could be functionally combined to create a seed value for frame selection.

We claim:

1. A method for secure transmission of data comprising:
using an acquisition system, acquiring a sequence of observed frames;
converting the observed frames into data frames;
grouping a plurality of the data frames into frame groups;
for each frame group, computing a group data signature;
transmitting to a reception system the data signature for each frame group along with the data frames of each respective frame group;
in the reception system, recomputing the data signature and,
if the recomputed data signature is identical to the transmitted data signature, accepting the transmitted data frames, but
if the recomputed data signature is not identical to the transmitted data signature, initiating an error protocol;
in which each transmission of the data frames comprising one of the groups is an event, further comprising generating an event signature for each event and transmitting the event signature along with the corresponding data signature, and determining the correctness of the transmission of the event as a function of the event signature; and
in which the event signature is a vector of values enabling recomputation upward through a distributed hash tree infrastructure to a calendar value that represents an uppermost value of the hash tree infrastructure at a corresponding calendar time.

2. The method of claim 1, further comprising computing a hash value for each data frame in each group, and computing the group data signature as a function of the hash values of the data frames in the respective group.

3. The method of claim 1, further comprising computing the respective group data signature as a function of a selected subset of the data frames in each group.

4. The method of claim 3, further comprising pseudo-randomly selecting the subset of data frames in each group used for computing the respective group data signature.

5. The method of claim 4, further comprising pseudo-randomly selecting the number of data frames in the subset of data frames in each group used for computing the respective group data signature.

6. The method of claim 5, further comprising generating a sequence of pseudo-random numbers from at least one seed value generated as a function of time, and pseudo-randomly selecting the number of data frames as a function of the pseudo-random numbers.

7. The method of claim 5, further comprising generating a sequence of pseudo-random numbers from at least one seed value generated as a function of geographic coordinates, and pseudo-randomly selecting the number of data frames as a function of the pseudo-random numbers.

8. The method of claim 2, further comprising computing the group data signature as the root value of a Merkle tree having the hash values of the data frames in the respective group as lowest level input values.

9. The method of claim 2, further comprising computing the hash values immediately after converting the observed frames into data frames and independent of further processing of the data frames for transmission.

10. The method of claim 2, further comprising computing the group data signature in a hardware component, without reliance on externally stored code.

11. The method of claim 2, further comprising:
storing, as part of metadata of at least one of the data frames in each group, the hash value of at least one other one of the data frames in the same group; and
in the reception system, upon detecting transmission failure of at least one of the data frames in a transmitted group, verifying remaining data frames in the group by recomputing the data signature using the hash value of the failed data frame retrieved from the metadata of a different one of the received data frames.

12. The method of claim 11, in which the at least one other one of the data frames is at least one of the data frames in the same group that occurred earlier.

13. The method of claim 11, in which the at least one other one of the data frames is at least one of the data frames in the same group that occurred later.

14. The method of claim 1, further comprising acquiring the sequence of data frames as image frames.

15. The method of claim 1, in which the acquisition system is a mobile platform.

16. The method of claim 15, in which the acquisition system is an unmanned aerial vehicle (UAV).

17. A system for secure transmission of data comprising:
an acquisition system that acquires frames;
a conversion module within the acquisition system for converting acquired frames into respective data frames;
a processor receiving the data frames and formatting the data frames, including frame metadata, for transmission;
a transmission device for transmitting the formatted data frames to a reception system;
a signature module provided for grouping a plurality of the data frames into frame groups and, for each frame group, computing a group data signature;
an event validation module, in which each transmission of the data frames comprising one of the groups is an event, said event validation module being provided for generating an event signature for each event and transmitting the event signature along with the corresponding group data signature;
said processor being further provided for formatting the data frames according to their respective groups and including the data signature for each frame group in transmission of the frame group;
whereupon said reception system may determine the correctness of the transmission of the event as a function of the event signature by recomputing the data signature and, if the recomputed data signature is identical to the transmitted data signature, accepting the transmitted data frames, but if the recomputed data signature is not identical to the transmitted data signature, initiating an error protocol;
in which the event signature is a vector of values enabling recomputation upward through a distributed hash tree infrastructure to a calendar value that represents an uppermost value of the hash tree infrastructure at a corresponding calendar time.

18. The system of claim 17, in which the signature module is provided for computing a hash value for each data frame in each group, and computing the group data signature as a function of the hash values of the data frames in the respective group.

19. The system of claim 17, in which the signature module is provided for computing the respective group data signature as a function of a selected subset of the data frames in each group.

20. The system of claim 19, further comprising a pseudo-random number generator (PRNG) outputting a sequence of pseudo-random numbers, in which the signature module is provided for pseudo-randomly selecting the subset of data frames in each group used for computing the respective group data signature according to the sequence of pseudo-random numbers.

21. The system of claim 18, in which the signature module is provided for computing the group data signature as the root value of a Merkle tree having the hash values of the data frames in the respective group as lowest level input values.

22. The system of claim 18, in which the signature module is provided for computing the hash values immediately after converting the observed frames into data frames and independent of further processing of the data frames for transmission.

23. The system of claim 18, in which the signature module is a hardware component, such that the group data signature is computed without reliance on externally stored code.

24. The system of claim 18, in which the processor is provided for storing, as part of metadata of at least one other one of the data frames in each group, the hash value of at least one other data frame in the same group, whereupon the reception system, upon detecting transmission failure of at least one of the data frames in a transmitted group, verifies remaining data frames in the group by recomputing the data signature using the hash value of the failed data frame retrieved from the metadata of a different one of the received data frames.

25. The system of claim 24, in which the at least one other one of the data frames is at least one of the data frames in the same group that occurred earlier.

26. The system of claim 24, in which the at least one other one of the data frames is at least one of the data frames in the same group that occurred later.

27. The system of claim 17, further comprising an event validation module, in which each transmission of the data frames comprising one of the groups is an event, said event validation module being provided for generating an event signature for each event and transmitting the event signature along with the corresponding data signature, whereupon said reception system determines the correctness of the transmission of the event as a function of the event signature.

28. The system of claim 27, in which the event signature is a vector of values enabling recomputation upward through a distributed hash tree infrastructure to a calendar value that represents an uppermost value of the hash tree infrastructure at a corresponding calendar time.

29. The system of claim 17, in which the acquisition system is a mobile platform.

30. The system of claim 29, in which the acquisition system is an unmanned aerial vehicle (UAV).

31. The system of claim 17, in which the frames are video frames.

32. The system of claim 17, in which the signature module is embodied within the processor.

33. A method for secure transmission of data comprising:
using an acquisition system, acquiring a sequence of observed frames;
converting the observed frames into data frames;
grouping a plurality of the data frames into frame groups;
for each frame group, computing a group data signature as a function of a selected subset of the data frames in each group;
pseudo-randomly selecting both the subset of data frames in each group and the number of data frames in the subset of data frames in each group used for computing the respective group data signature;
transmitting to a reception system the data signature for each frame group along with the data frames of each respective frame group;
in the reception system, recomputing the data signature and,
if the recomputed data signature is identical to the transmitted data signature, accepting the transmitted data frames, but
if the recomputed data signature is not identical to the transmitted data signature, initiating an error protocol.

34. The method of claim 33, further comprising generating a sequence of pseudo-random numbers from at least one seed value generated as a function of time, and pseudo-randomly selecting the number of data frames as a function of the pseudo-random numbers.

35. The method of claim 33, further comprising generating a sequence of pseudo-random numbers from at least one seed value generated as a function of geographic coordinates, and pseudo-randomly selecting the number of data frames as a function of the pseudo-random numbers.

36. A system for secure transmission of data comprising:
an acquisition system that acquires frames;
a conversion module within the acquisition system for converting acquired frames into respective data frames;
a processor receiving the data frames and formatting the data frames, including frame metadata, for transmission;
a transmission device for transmitting the formatted data frames to a reception system;
a signature module provided for grouping a plurality of the data frames into frame groups and, for each frame group, computing a group data signature as a function of a selected subset of the data frames in each group;
a pseudo-random number generator (PRNG) outputting a sequence of pseudo-random numbers, in which the signature module is provided for pseudo-randomly selecting the subset of data frames in each group used for computing the respective group data signature according to the sequence of pseudo-random numbers;
said processor being further provided for formatting the data frames according to their respective groups and including the data signature for each frame group in transmission of the frame group;
whereupon said reception system may recompute the data signature and, if the recomputed data signature is identical to the transmitted data signature, accept the transmitted data frames, but if the recomputed data signature is not identical to the transmitted data signature, initiating an error protocol.

37. The system of claim 36, in which the PRNG is provided for generating the sequence of pseudo-random numbers from at least one seed value generated as a function of time, in which the signature module is provided for pseudo-randomly selecting the number of data frames as a function of the pseudo-random numbers.

38. The system of claim 36, in which the PRNG is provided for generating the sequence of pseudo-random numbers from at least one seed value generated as a function of geographic coordinates, in which the signature module is provided for pseudo-randomly selecting the number of data frames as a function of the pseudo-random numbers.

* * * * *